United States Patent [19]

Chang

[11] Patent Number: 4,530,788
[45] Date of Patent: Jul. 23, 1985

[54] OIL SEED PROTEINS EVIDENCING IMPROVED FUNCTIONALITY

[75] Inventor: Pei K. Chang, Montrose, N.Y.

[73] Assignee: Stauffer Chemical Company, Westport, Conn.

[21] Appl. No.: 446,827

[22] Filed: Dec. 3, 1982

[51] Int. Cl.$^3$ ................................................ A23J 1/14
[52] U.S. Cl. ............................. 260/123.5; 260/112 R; 426/656; 426/646
[58] Field of Search ................... 260/123.5, 112 R; 426/656, 646

[56] References Cited

U.S. PATENT DOCUMENTS

| | | | |
|---|---|---|---|
| 2,377,624 | 6/1945 | Gordon | 260/112 |
| 3,637,643 | 1/1972 | Wingerd | 260/123.5 X |
| 3,669,677 | 6/1972 | Sair et al. | 99/17 |
| 3,809,767 | 5/1974 | Sair | 260/123.5 X |
| 3,849,391 | 11/1974 | Egger et al. | 260/123.5 O |
| 4,043,990 | 8/1977 | Melachouris | 260/112 |
| 4,054,679 | 10/1977 | Melcer et al. | 426/656 |
| 4,113,716 | 9/1978 | Gomi | 260/123.5 O |
| 4,172,828 | 10/1979 | Davidson et al. | 260/123.5 O |
| 4,309,344 | 1/1982 | Walsh | 260/123.5 O |

Primary Examiner—John Kight
Assistant Examiner—Garnette D. Draper
Attorney, Agent, or Firm—Paul J. Juettner

[57] ABSTRACT

A process for improving the viscosity of vegetable protein-containing solutions which comprises:

1. adjusting the pH of an aqueous solution containing from about 3.5% to about 9.5% vegetable protein such as an oil seed protein wherein at least a major proportion of the protein is insoluble at its isoelectric point to a pH within the range of from about 7.5 to about 12;
2. heating the alkaline solution of step (1) to an elevated temperature at a rate sufficient to produce an increase in viscosity and insufficient to provide a reduction in solubility; and
3. cooling said heated solution to a temperature sufficient to retard further substantial change in the protein.

19 Claims, No Drawings

OIL SEED PROTEINS EVIDENCING IMPROVED FUNCTIONALITY

The present invention relates to vegetable protein and particularly to oil seed proteins evidencing increased functionality and processes for preparing the same.

BACKGROUND OF THE INVENTION

A large amount of oil is expressed from oil seed leaving a solids residue or cake. The cake contains usable protein values and is generally used as is as a supplement to animal feed. The protein values have also been extracted to provide a high protein content material for use in human food. The protein has been used as a protein fortifier additive as well as in some functional capacity. However, less expensive oil seed proteins have not been used substantially as substitutes for high cost functional proteins such as sodium caseinate.

Sodium caseinate is a solubilized form of the protein casein. Casein is insoluble at its isoelectric point. Both are non-gelable upon heating. Sodium caseinate has found extensive use in foods as it imparts creaminess, firmness and smoothness to the consistency of products, thermoplasticity to imitation cheese, high buffering capacity to products such as coffee whiteners, and emulsifying and water absorption effects in addition to its nutritional value. Sodium caseinate is also effective as a binder or extender in meats, soups and the like.

It is known in accordance with EPO Publication No. 0029370 published 5/27/81, that the thermogelation temperature of a protein which is soluble under alkaline pH and at its isoelectric point, such as whey protein, (dairy or soy) can be reduced by heating the protein in solution at an alkaline pH of 7.5 to 10, at a temperature above 50° C. and below the gelation temperature, cooling the heated solution before the protein gels and reducing the pH to neutral. The reference specifically states that protein which is insoluble at alkaline pH cannot be made soluble. The teachings of this reference are directed to lowering the thermogelation temperature of a thermogelable protein or as a corollary increasing the gel strength when heated under normal gelation conditions. The proteins treated in accordance with the process of the reference are the proteins soluble at the isoelectric point, the reference being particularly directed to dairy whey protein.

It is the intent of the invention to provide processes for improving the functionality of vegetable protein including oil seed protein and particularly for providing protein evidencing increased functionality including increased solution viscosity.

SUMMARY OF THE INVENTION

In accordance with the present invention, it has been found that a vegetable protein which is substantially insoluble at its isoelectric point and substantially soluble above or below the isoelectric point can be treated to improve its functionality by a process which comprises:
1. adjusting the pH of an aqueous solution of a vegetable protein which is substantially insoluble at its isoelectric point and substantially soluble above and below that point, said protein being soluble in alkaline solution, to a pH ranging from about 7.5 to about 12.0, the total dissolved protein content ranging from about 3.5% to about 9.5%;
2. heating the alkaline solution of step (1) to an elevated temperature for a period of time sufficient to produce the desired increase in viscosity; and
3. cooling the heated solution to retard further change in the protein, such as to a temperature below 60° C. and preferably within the range of from about 30° C. to about 10° C. and, optionally,
4. neutralizing the pH and drying.

The protein product prepared by this process is characterized by improved functionality including increased viscosity, water absorption, whippability and emulsifying properties and decreased gel strength of heated gels.

The preferred oil seed protein is soy bean protein. The protein can also be treated with protein precipitating agents such as long chain polyphosphates (sodium hexametaphosphate) to increase yield as well as add possible nutritional benefits. Blends with other proteins which are soluble at their isoelectric point such as soy whey protein can be added to the vegetable protein of the invention. The product of the invention can be used as a thickener in foods or a partial replacement for sodium caseinate.

As an additional benefit, treatment of soy protein and particularly polyphosphate treated soy protein in accordance with the process of the invention reduces the characteristic "beany" odor of soy protein providing a more acceptable organoleptic product.

DETAILED DESCRIPTION OF THE INVENTION

The proteins which can be treated in accordance with the present invention are vegetable proteins which are insoluble at their isoelectric points and soluble above and below their isoelectric points. The preferred vegetable proteins are those proteins described as oil seed proteins which are generally derived from oil seed cake, i.e., that material left after expression of oil from such seeds as cottonseed, palm, peanut, rape, safflower, sesame, soy bean, sunflower and the like. Extractable protein from other vegetable sources such as peas (chick, field, lentil, broad, wrinkled, white and the like), beans (mung, winged, caster, faba, lima, pinto, kidney and the like), grains (wheat, rye, rice and the like), stringbeans and leaves (alfalfa, clover, legumes, vegetables and the like) can also be used. The preferred protein is soy bean protein.

The following discussion is directed to the preferred oil seed protein though it equally applies to other vegetable protein sources.

Oil from oil seed is usually extracted from cleaned, decorticated and heated kernels which have been flaked to small size. Continuous screw pressing and hydraulic pressing with or without heat are known methods. The oil can also be extracted using solvents. In this case, the seed cake is usually treated to remove the solvent for recycling in the process such as with steam. These are all standard, well known and documented methods.

The residue or cake from the oil extracting process can be processed as is or dried. The cake is prepared under conditions of manufacture which are suitable for preparing a product for the intended use such as for human consumption. Any procedures for removal of toxic substances such as gossypol from cottonseed meal can be performed at this stage.

The cake or dried form thereof generally having a protein content of less than 55% are treated in accordance with known processes to concentrate the protein such that the dried product has at least 60% and preferably at least 70% protein and more preferably at least 90% protein. These procedures are well known to those skilled in the art. For example, and in connection with the preferred soy bean protein, soy protein concentrate (at least 70% protein $-N \times 6.25$ on a moisture free basis) can be prepared by one of three general processes. In the first, low molecular weight material is extracted with water at about pH 4.5, the average isoelectric point of the major soy bean globulins. The leached material, if neutralized prior to drying, exhibits a high solubility of the nitrogen-containing compounds in water.

In the second procedure, sugars are extracted by leaching with 60% to 80% aqueous alcohol. In the third procedure, the protein is denatured by moist heat and then extracted with water. The latter two processes provide products of low solubility of the nitrogen-containing compounds in water due to protein denaturation. The material is called a soy protein concentrate and contains from about 60% to about 90% and generally from about 68% to about 70% protein. Soy protein isolate which contains at least about 90% protein can be prepared by extracting the protein with dilute alkali and precipitating the protein at the isoelectric point with acid at about pH 4.5. The curd (precipitate) from this method is usually dispersed in water and neutralized to resolubilize the protein. The protein solution can be treated as is or dried by means normally used for such purpose such as spray drying.

The method of extraction is not critical and any procedure for extracting the vegetable protein with a limited degree of denaturation (less than about 5%) can be used. The extraction method for soy protein is given as illustrative of the many known methods for extracting vegetable protein from various vegetable protein sources well known to the skilled artisan. Extraction procedures which include heating steps which significantly denature the protein as evidenced by an increase in insolubles should be avoided.

The protein for use in the present invention must form a soluble solution under alkaline conditions. The protein containing solution for use in the process of the invention can be obtained by using an existing protein solution such as that obtained by dissolving freshly separated protein at a pH above its isoelectric point or by dissolving a protein source in water at above its isoelectric point. Preferably, the protein solution is obtained by isolating the protein at its isoelectric point, dispersing the protein in water without drying, and solubilizing the protein by elevating the pH above its isoelectric point. The protein content of the solution to be treated can range from about 70% to about 95% based on total solids. Preferably, the solution contains from about 5% to about 10% total solids and from about 3.5% to about 9.5% protein.

Subsequent to the dispersion or dissolution of the protein, the pH is adjusted to an alkaline range of from about pH 7.5 to about pH 12, preferably from about pH 7.5 to about pH 10, and more preferably from about pH 8 to about pH 9.5. Most effective results have been achieved at about pH 8. Any food grade alkalizing agent which does not interfere with the final reaction product and/or its use can be used. Preferably, sodium and potassium hydroxide and more preferably sodium hydroxide are used. Calcium hydroxide, while being an effective alkalizing agent, is less preferred since calcium can cause insolubilization of the protein. Other methods of elevating the pH can be used such as passing the protein system through an anionic/cationic exchange resin.

The alkalizing agent is added under conditions which will not cause localized pH elevations above about pH 12 to thereby avoid extensive protein denaturation. These conditions can vary depending upon the strength of the alkalizing agent, the degree of agitation and the rate of addition. These factors would be obvious to one skilled in the art.

The alkaline soy protein solution is then heated to a temperature within the range of from about 50° C. up to the denaturation temperature of the protein for a time sufficient to increase the solution viscosity (at least about 50%) but not sufficient to cause a drop in solubility. The heating temperature preferably ranges from about 70° C. to about 121° C., and more preferably from about 90° C. to about 100° C. The maximum heating time is dependent on the concentration of the protein. The heating time should not be over a maximum of one hour and preferably between about 15 minutes and 45 minutes depending on the temperature of processing. The heating can be accomplished in a vessel with a heating means or other equivalent. The heating is conducted at a rate such that an improvement in functionality is obtained. The alkali can also be added to a heated solution or the alkalization and heating can be conducted simultaneously.

After the alkalized protein solution has been heated for a desired time, cooling is preferably applied to reduce the temperature of the solution below that at which further change in the protein structure occurs and preferably to room temperature. Adequate agitation is necessary to ensure that cooling is uniform throughout the mass. To retard further change in the protein, cooling is initiated within one hour after the completion of the heating step and preferably in less than 15 minutes depending on the heating temperature used. Protein structure change caused by heating is halted or significantly retarded at a temperature below about 60° C. and preferably between about 30° C. and about 10° C.

Subsequent to cooling, the pH can optionally be adjusted to a range of from about 6 to about 7.5 (neutral) and preferably from about 6.5 to about 7.5 with any food grade acid including substances which form such acids such as $CO_2$. The strength of the acid and its rate of addition and agitation are dependent on avoiding localized reductions in pH which may affect the protein as would be obvious to one skilled in the art.

Since the cooling step is preferably conducted with rapid agitation, it is possible to adjust the pH during the cooling step. Acid addition can be initiated at the same time that the cooling is initiated or towards the end of the cooling period.

While neutralization is used in preparing a dried product for general use, a partially alkaline or partially acidic product can also be prepared by adjusting the pH to the level desired.

The neutralized product can be used as is, concentrated and/or dried. If an aqueous dispersion of protein is utilized, refrigeration must be maintained to avoid spoilage. Concentration or drying should be conducted under conditions which will not further substantially denature the product. The product can be concentrated by mechanical means such as an evaporator or dried by the use of freeze-drying, vacuum or spray drying. The preferred method of drying is spray drying.

The vegetable protein treated in accordance with the invention can be from a single protein source or a blend of vegetable protein. Further, up to 50% and preferably from about 5% to about 25% of another protein which is soluble at its isoelectric point can also be included. Proteins of this type are illustrated by whey protein such as soy whey protein and dairy whey protein. The soy whey protein can be isolated by known means including ultrafiltration and chemical precipitation such as by the use of sodium hexametaphosphate. In using diary whey, temperature conditions must be tempered to avoid protein coagulation as this would provide a product of higher insolubles.

It has also been found that the oil seed protein, if treated with a polyphosphate during isolation, provides an increase in yield based on total Kjeldahl nitrogen and evidence of increased nutritional values as determined by the pro-byte mathematical method. Useful polyphosphates correspond to the following formula:

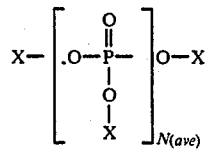

and where X represents individually hydrogen or an alkali metal including ammonium and preferably sodium or potassium. $N_{(ave)}$ represents an average chain length ranging from about 2 to generally not more than about 50. The average chain length as employed herein is intended to represent a statistical average chain length or indication of the number of recurring units linked together comprising the anionic species. Such an average is determined by titration as described in Van Wazer et al., Analytical Anal. Chem. 26, 1755-9(1954).

Representative compounds include sodium tripolyphosphate and preferably sodium hexametaphosphate. ($N_{(ave)}$ at least 3 and preferably 8–12).

The polyphosphate is added to the protein during isolation prior to the final precipitation at the isoelectric point. In connection with the preferred soy protein, the polyphosphate is preferably combined with the soy flour prior to the separation pH adjustment steps needed to prepare the soy protein concentrate or soy protein isolate. The additional yield is thought to be whey proteins normally lost in the concentration process. Preferably, the polyphosphate is sodium hexametaphosphate and is used in an amount ranging from about 25% to about 45% based on the weight of the protein in the initial starting material.

It has been found that the beany odor of a soy bean composition can be significantly reduced by treatment of soy bean protein and particularly a polyphosphate isolated soy bean protein in accordance with the invention as determined organoleptically. Reduction in beany odor reduces a significant impediment to the use of soy bean protein.

The compositions of the present invention can be used in a functional manner in any area but particularly in foods. The increased solution viscosity can be effectively utilized as emulsifiers, binders, moisture retainers and stabilizers in various food products such as meats, cheese, imitation cheese, soups, gravies and baked goods. The compositions of the invention can also be used as partial replacements for sodium caseinate in meat binders, coffee whiteners and the like. The compositions more adaptable for preparing dry blended compositions because of the reduced beany odor which heretofore found restricted use of soy protein for that reason.

The viscosities in the following examples were determined using a Brookfield Viscosimeter, Model RVT. The percent insolubles were determined by a centrifugation method.

As used herein, the percent protein is based on total Kjeldahl nitrogen. Percent protein in a dry product is by weight based on the total dry weight of the product. The percent protein of the solutions treated is by weight of the proteins in solution (TKN) based on the total weight of the solution.

The invention will be illustrated in the following Examples:

EXAMPLE 1

Two soy protein samples were prepared as follows, one using a conventional process and the other utilizing the process of the invention.

CONVENTIONAL 135 kilograms of soy flour was dissolved in 1,368 liters of water. The pH was adjusted to 9.0 with 4 N NaOH and the mixture was held at 35° C. for 45 minutes. The supernatant remaining after centrifugal clarification (soy milk) which contained the soy protein was adjusted to pH 4.4 with 4 N HCl. After centrifugal clarification, one-third of the curd (a soy protein isolate) was dispersed in water to approximately 10% total solids and the pH adjusted to 7.0. The solution was spray dried to provide a soy protein product.

INVENTION

One-third of the soy isolate prepared above was dispersed in water to 6% total solids. The pH was adjusted to 8 with 4 N NaOH and the solution was heated at 95°–100° C. for 30 minutes. After cooling to room temperature the pH of the solution was adjusted to 7 with 4 N HCl. The product obtained by spray drying the solution can be termed modified soy protein isolate.

The functionality of the two products were compared to each other and to sodium caseinate as follows:

TABLE I

| Sample | % Protein | % Insolubles | Viscosity (Cps)* | % Water Absorption (Farinograph) |
|---|---|---|---|---|
| Soy Protein | 75.6 | 2.19 | 22 | 92 |
| Modified Soy Protein | 75.4 | 0.25 | 44 | 169 |
| Sodium Caseinate | 90 | <1.0 | 50 | 268 |

*10% Total Solids

As can be seen from this data, soy protein modified in accordance with the invention has improved solution viscosity and percent water absorption as compared to untreated soy protein and approximates more closely the values provided by sodium caseinate even though the protein content of the modified soy protein product is lower than sodium caseinate.

The two soy protein samples were compared for gel strength. The gel strength of a 15% total solids solution in grams gelled at 70° C. was 35 grams for the unmodified soy protein and 33 grams for the modified soy protein. When gelled at 85° C., the gel strengths were 118 and 60 grams respectively.

EXAMPLE 2

90 kilograms of soy flour were dispersed in 988 liters of water containing 19.8 kilograms of sodium hexametaphosphate. The pH was adjusted to 7.0 with 4 N NaOH and the solution held at 35° C. for 45 minutes. The supernatant obtained by centrifugal clarification was adjusted to pH 3.0 with 4 N HCl. The soy isolate so precipitated was separated by centrifugal clarification.

A portion of the soy isolate (about ½) was dispersed in water to about 10% total solids. After adjusting the pH to 7.5 with 4 N NaOH, the solution was spray dried to provide a soy protein isolate modified with sodium hexametaphosphate, termed soy proteinSHMP. The remaining portion was dissolved in water to about 6% total solids. After adjusting the pH to 8.0 with 4 N NaOH, the solution was heated at 95°–100° C. for 30 minutes. After cooling to room temperature the pH was adjusted to 7. The product, was spray dried and was termed modified soy proteinSHMP.

The effect of the process of the invention on the functionality of soy protein isolate-SHMP was determined and compared to sodium caseinate as follows:

TABLE II

| Sample | Protein % | Insolubles % | Viscosity (Cps) (6% T.S.) | Whippability Foam (Sp. Gr) | Syneresis (Ml) | Emulsification Capacity (Ml. oil/gm) |
|---|---|---|---|---|---|---|
| Soy Protein-SHMP | 73 | 2.0 | 12 | 0.167 | 17.6 | 928 |
| Modified Soy Protein-SHMP | 73 | 1.66 | 20 | 0.135 | 2.8 | 1,340 |
| Sodium Caseinate | 90 | <1.0 | 19 | 0.094 | 0 | 1,048 |

Whippability was determined by mixing 100 gm of a solution of protein in water at 10% total solids in a small Hamilton Beach Mixer on speed 10 for 7 minutes. The specific gravity of the foam was then measured. The stability of the foam was determined by the syneresis (weep) rate; i.e., the amount of drainage after 15 minutes at room temperature from 40 grams of foam setting on a wire screen inside a 200 milliliter funnel. Emulsification capacity was determined by titrating 25 grams of a 0.1% total solids solution with corn oil. The end point of the titration as indicated by an indefinite resistance was determined by submerging an ohm-meter probe into the oil protein dispersion. As can be seen from the data, the protein treated in accordance with the invention provides a viscosity substantially increased over the control and substantially equivalent to sodium caseinate. The product of the invention also shows improvement in whippability and a significant reduction in syneresis. Emulsification capacity is significantly improved over the control and sodium caseinate.

EXAMPLE 3

In order to increase the protein content in the product prepared in Example 1, an additional overnight settling step was added to insure adequate separation of the soy whey from the soy curd.

Soy milk was prepared as in Example 1. The pH of the soy milk was adjusted to 4.4 and the curd was allowed to settle overnight. The supernatant (soy whey) was siphoned off and the remaining material was reslurried in an equal amount of water. The curd was separated by centrifugal clarification, resolubilized by neutralization and spray dried.

In order to determine the effect of the process of the invention on the strength of a thermogel, a 15% total solids solution was prepared. A portion of the solution was stored in the refrigerator and a portion was heated to 90° C. for 30 minutes. The following results were obtained:

TABLE III

| Sample | Protein % | Insolubles % | Viscosity** (Cps) | Gel Strength (gms) Unheated(a) | Heated(b) |
|---|---|---|---|---|---|
| Soy Protein-Conventional | 90 | 0.85 | 28 | No Gel | 206 |
| Modified Soy | 86.5 | 9.67* | 1,588 | Weak | 126 |
| Sodium Caseinate | 90 | <1.0 | 50 | No Gel | 0 |

*Gel-like material
**10% Total Solids
(a) 15% Total Solids Solution - Stored in Refrigerator
(b) 15% Total Solids Solution - Heated at 90° C. for 30 minutes As can be seen from this data, a soy protein modified in accordance with the invention provides a weak cold gel over an unmodified soy protein. This can be ascribed to the increase in solution viscosity of the products of the invention.

The gel strength of a thermogel of the modified soy protein significantly decreases over the non-modified soy protein more closely approximating that of sodium caseinate.

EXAMPLE 4

The same settling step as shown in Example 3 was applied to the process for preparing soy protein isolate-SHMP as shown in Example 2 and the product was tested for cold gel and thermogel characteristics with the following results:

TABLE IV

| Sample | Protein % | Insolubles % | Viscosity** (Cps) | Whippability Foam (Sp. Gr) | Syneresis (Ml) | Gel Strength (gms)*** Heated | Unheated |
|---|---|---|---|---|---|---|---|
| Soy Protein-SHMP (Ex. 4) | 77.5 | 7.77* | 25 | 0.154 | 1 | 124 | No Gel |
| Modified Soy Protein-SHMP (Ex. 4) | 76.3 | 8.74* | 58 | 0.140 | 0 | Crumbly Gel | Weak Gel |
| Sodium Caseinate | 90 | <1.0 | 50 | 0.094 | 0 | 0 | No Gel |

*Gel-like material
**10% Total Solids
***Heat Treatment same as in Example 3

Based on the above data, the process of the invention exhibited a greater change in solution viscosity of a conventional soy protein isolate vis-a-vis soy protein isolate-SHMP. The modified product of the invention provided a significantly weaker thermo-gel than that of the non-modified material.

EXAMPLE 5

Non-specific meat loaves were prepared from the following formulation:

| | Formulation | |
|---|---|---|
| | Invention (gms) | Control (gms) |
| Ground Chuck | 328 | 328 |
| Water | 66 | 66 |
| Salt | 6 | 6 |
| Binder | 12 | — |

Meat, sufficient for testing, was mixed in a Hobart mixer at speed No. 1 for 1-2 minutes. Several 328 gram samples were weighed out. The meat samples were refrigerated at 10° C. Salt, water and, if present, binder were admixed with the meat samples and blended for 30 seconds in a food processor (Cuisinart). After scraping, the meat was blended another 30 seconds. Three 100 gram samples were placed in 250 milliliter beakers and covered with foil. The samples were refrigerated for 3 hours and cooked in an 80° C. water bath for 40 minutes. After cooling for 30 minutes the juice was poured off and the final yield obtained. The following results were obtained:

TABLE VI

| Sample | % Yield* | pH |
|---|---|---|
| SPI-Conventional (Ex. 1) | | |
| A. Untreated | 65.38 | 6.29 |
| B. Modified SPI-Conventional | 67.15 | 6.16 |
| SPI-SHMP (Ex. 2) | | |
| A. Untreated | 64.16 | 6.23 |
| B. Modified SPI-SHMP | 66.67 | 6.17 |
| Controls | | |
| No Binder | 56.69 | 6.12 |
| Sodium Caseinate | 67.40 | 6.14 |

*(Weight after cooking/ weight before cooking) × 100

The percent yield of non-specific loaves containing soy protein made by the conventional process of Example 1 and the SHMP process of Example 2 was lower than the yield for loaves containing sodium caseinate. The percent yield was improved using the modified SPI.

What is claimed is:

1. A process for treating extracted vegetable protein which comprises:
   1. adjusting the pH of an aqueous solution of extracted vegetable protein having from about 70% to about 95% protein wherein at least a major proportion of the protein is insoluble at its isoelectric point, said protein being soluble in alkaline solution, to a pH within the range of from about 7.5 to about 12, the total solids of said solution ranging from about 5% to about 10% by weight, and the total dissolved protein content ranging from about 3.5% to about 9.5% by weight when determined at said pH;
   2. heating the alkaline solution of step (1) to an elevated temperature within the range of from about 70° C. to about 121° C. for less than 1 hour and at a rate sufficient to produce the desired increase in viscosity and insufficient to provide a reduction in solubility; and
   3. cooling said heated solution to a temperature below 60° C. and sufficient to retard further substantial change in the protein.

2. The process as recited in claim 1 wherein said vegetable protein is an oil seed protein selected from the group consisting of cottonseed, palm, rape, safflower, sunflower, sesame, soy bean, peanut and mixtures thereof.

3. The process as recited in claim 1 wherein said vegetable protein is soy bean protein.

4. The process as recited in claim 1 wherein the time period for heating ranges from about 15 minutes to about 45 minutes.

5. The process as recited in claim 1 wherein said solution is cooled to a temperature within the range of from 30° C. to 10° C.

6. The process as recited in claim 1 wherein the pH of the solution after heating is neutralized.

7. The process as recited in claim 1 wherein said vegetable protein is prepared by solubilizing oil seed protein from an oil seed residue having less than 55% protein and precipitating the protein at the isoelectric point thereof.

8. The process as recited in claim 7 wherein said solubilization step is conducted in the presence of from about 25% to about 45% of an alkali metal polyphosphate, based on the weight of the protein in the source.

9. The process as recited in claim 8 wherein said alkali metal polyphosphate is sodium hexametaphosphate.

10. The process as recited in claim 1 wherein said protein composition also includes from about 5% to about 25% of a second protein soluble at its isoelectric point.

11. The process as recited in claim 10 wherein said second protein is oil seed whey protein.

12. The process as recited in claim 11 wherein the protein is separated from the oil seed whey in the presence of an alkali metal polyphosphate.

13. The process as recited in claim 12 wherein said alkali metal polyphosphate is sodium hexametaphosphate.

14. The process as recited in claim 12 wherein said oil seed whey is soy bean whey.

15. The product of claim 1.

16. The product of claim 3.

17. The product of claim 10.

18. A comminuted meat product containing as a binder therefor the product of claim 15.

19. A comminuted meat product containing as a binder therefor the product of claim 17.

* * * * *